United States Patent Office 2,968,645
Patented Jan. 17, 1961

2,968,645

SYNTHETIC RUBBER EMULSION POLYMERIZATIONS IN THE PRESENCE OF ALPHA OR BETA CONIDENDROL

George B. Sterling, Midland, Mich., assignor to The Dow Chemical Company, Midland, Mich., a corporation of Delaware No Drawing. Filed Aug. 25, 1958, Ser. No. 757,088

5 Claims. (Cl. 260—63)

This invention relates to improvements in activated organic peroxide catalyzed synthetic rubber emulsion polymerizations. It pertains especially to a process of polymerizing an aqueous emulsion of polymerizable synthetic rubber-forming monomers consisting essentially of butadiene-1,3 or mixtures of butadiene-1,3 with compounds which contain a single $CH_2=C<$ group, in the presence of alpha or beta conidendrol for increasing the rate of polymerization.

Synthetic rubber such as butadiene-styrene copolymers are commonly prepared by polymerizing a mixture of butadiene and styrene in an aqueous emulsion in the presence of an organic peroxide catalyst employing a "redox" system, wherein as activators for the peroxide catalyst, and in so-called regenerated recipes, a reducing sugar, a ferrous salt and an alkali pyrophosphate are included to continually regenerate the ferrous ions. However, the ferrous pyrophosphate-sugar activators must be aged at carefully regulated temperatures to bring the activator to the optimum activity. It is known to add an alkali salt of ethylenediamine tetraacetic acid to such ferrous pyrophosphate-sugar activated organic peroxide catalyzed synthetic rubber emulsion polymerizations to increase the rate of conversion, see Ind. Eng. Chem., vol. 41, pages 1592–1599 (1949).

U.S. Patent No. 2,716,107 makes synthetic rubbers by carrying out the polymerization of synthetic rubber-forming monomers such as butadiene-1,3 or mixtures of butadiene-1,3 and styrene in an aqueous emulsion containing an organic peroxide catalyst, an iron salt, an alkali salt of ethylenediamine tetraacetic acid and a small amount of ketone sulfoxylate or an aldehyde sulfoxylate to increase the rate or reaction.

According to the present invention, it has now been discovered that the reaction rate of organic peroxide catalyzed synthetic rubber aqueous polymerizations activated by an iron salt and an alkali salt of ethylenediamine tetraacetic acid is increased by the addition of alpha or beta conidendrol.

It has further been found that the conidendrol acts as an antioxidant for the rubber and performs a dual function of increasing the rate of polymerization and inhibiting oxidation of the rubber upon completion of the reaction.

In carrying out the invention, the synthetic rubber-forming polymerizable monomers are polymerized in an aqueous emulsion in the presence of an organic peroxide catalyst, a water-soluble iron salt, an alkali salt of ethylenediamine tetraacetic acid and alpha or beta conidendrol or a mixture of alpha and beta conidendrol.

The compound conidendrol has the structural formula:

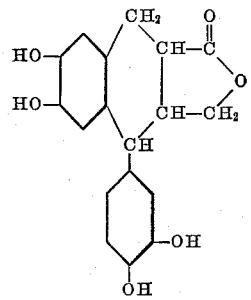

The alpha and beta conidendrols are optically active forms, and can be purchased from Crown Zellerbach Corporation. The conidendrol is employed in amounts corresponding to from 0.01 to 5, preferably from 0.05 to 2, percent by weight of the synthetic rubber-forming monomers initially used.

The synthetic rubber-forming polymerizable monomers can be one or a mixture of two or more aliphatic conjugated organic compounds, i.e. butadienes, such as butadiene-1,3, isoprene, chloroprene or 2,3-dimethyl butadiene-1,3. The polymerizable material is preferably a mixture of one or more of such butadienes with one or more polymerizable compounds which are capable of forming rubber copolymers with butadiene-1,3, e.g. up to 70 percent by weight of such mixture of one or more organic compounds which contain a single $CH_2=C$ group. Examples of such monoolefinic compounds are monovinyl aromatic compounds such as styrene, vinyltoluene, vinylxylene, isopropylstyrene, tert.-butylstyrene, para-chlorostyrene, dichlorostyrene, ethylacrylate, methyl methacrylate, acrylonitrile, methyl vinyl ether, methyl vinyl ketone, methyl isopropenyl ketone, vinylidene chloride or vinyl pyridine.

The catalyst can be a conventional organic peroxide or hydroperoxide such as cumene hydroperoxide, diisopropylbenzene hydroperoxide, tert.-butyl hydroperoxide, di-tert.-butyl peroxide, dicumyl peroxide, tert.-butyl isopropylbenzene hydroperoxide, phenylcyclohexane hydroperoxide, para-menthane hydroperoxide, cymene hydroperoxide, or the like. The peroxide catalyst is usually employed in amount corresponding to from 0.02 to 2 parts by weight per 100 parts by weight of the polymerizable monomers.

The iron salt may be any water soluble iron salt, for example ferrous sulfate or ferric chloride. The amount of iron salt will generally be that equivalent to from 0.0002 to 0.02 parts by weight of iron (Fe) per 100 parts of the polymerizable monomers.

The alkali salt of ethylenediamine tetraacetic acid in an alkaline medium is the tetraalkali salt, i.e. the tetrasodium, tetrapotassium or tetraammonium ethylenediamine tetraacetate. In general the aqueous medium in synthetic rubber polymerizations is alkaline. The tetraalkali ethylenediamine tetraacetate can be added as the tetraalkali salt to the alkaline emulsion of polymerizable monomers or it can be formed by neutralization in situ on the addition of the free ethylenediamine tetraacetic acid or the mono-, di- or tri-alkali salts of ethylenediamine tetraacetic acid. The alkali salt of ethylenediamine tetraacetic acid, is generally used in amount corresponding to from 0.001 to 0.5 part per 100 parts by weight of the polymerizable monomers, suitably in amount of from one-third to twice the amount of iron (Fe) present, although greater amounts can be used.

The emulsifying agents can be water-soluble soaps or surfactants such as alkali salts of aliphatic acids having from 8 to 24 carbon atoms, rosin acids, naphthenic acids or other anionic surface-active emulsifying and dispersing agents. Examples of suitable emulsifying agents are sodium lauryl sulfate, sodium or potassium salt of disproportionated rosin acid, sodium salt of dodecylbenzene sulfonic acid, sodium stearate, sodium oleate and the like.

The polymerization can be carried out at temperatures between 0° and 100° C., preferably from 5° to 80° C. and at superatmospheric pressure. The conversion of the monomers to polymer can be stopped at any desired point, but is usually carried to at least 50 percent completion, preferably to from 85 to 100 percent polymerization. The polymerization may be stopped by the addition of a so-called shortstopping agent which inhibits further polymerization of the monomers such as ditertiary butyl hydroquinone, alkali dimethyl thiocarbamates and dinitrochlorobenzene. The unreacted residual monomers are removed from the latex by venting off the gaseous monomers and by steam distilling under reduced pressure the residual higher boiling point or liquid monomers. The synthetic rubber can be recovered by coagulating the latex with salt or acid in usual ways.

The following examples illustrate ways in which the principle of the invention has been applied, but are not to be construed as limiting its scope.

EXAMPLE 1

In each of a series of experiments, aqueous emulsions of synthetic rubber-forming monomers were made up employing the following recipe:

| Ingredients: | Parts by weight |
|---|---|
| Butadiene | 60 |
| Acrylonitrile | 20 |
| Methyl isopropenyl ketone | 20 |
| Water | 110 |
| Potassium salt of disproportionated rosin acid | 4 |
| Diisopropylbenzene hydroperoxide | 0.31 |
| Tetrasodium salt of ethylenediamine tetraacetic acid | 0.14 |
| $FeCl_3 \cdot 6H_2O$ | 0.07 |
| KCl | 0.3 |
| KOH | 0.15 |
| tert.-Dodecyl mercaptan | 0.3 |
| Conidendrol | Variable |

The ingredients were placed in a closed pressure resistant vessel and agitated vigorously to effect emulsification. The emulsion was agitated mildly and heated at a temperature of 5° C. for a period of 5 hours to polymerize the monomers. Thereafter, the vessel was vented. The percent conversion of monomers to polymer was determined by evaporation of a weighed portion of the latex. An aqueous emulsion containing 1.5 percent by weight, based on the weight of the copolymer, of Agerite Resin D (polytrimethylquinoline) was added, to the latex as stabilizer. The rubbery copolymer was recovered by coagulation and was washed and dried. A portion of the copolymer was compounded with other ingredients to form a rubber composition employing the following recipe:

| Ingredients: | Parts by weight |
|---|---|
| Copolymer | 100 |
| Carbon black | 20 |
| Zinc oxide | 5 |
| Sulfur | 1.5 |
| Stearic acid | 1 |
| Altax (benzothiazil disulfide) | 1 |

The ingredients were compounded on laboratory rolls at room temperature to form a homogeneous composition. The composition was rolled into a sheet ⅛-inch thick and cured under pressure by heating at a temperature of 300° F. for 40 minutes. Test pieces were cut from the cured rubber sheet. These test pieces were used to determine the tensile strength and elongation for the product employing procedures similar to those described in ASTM D412–51T. Hardness was determined by procedure similar to that described in ASTM D676–47T. Table I identifies the copolymer by giving the proportions of the monomers and the proportion of conidendrol employed in making the same. The table also gives the percent yield or percent conversion of the monomers to polymer, and gives the properties determined for the cured rubber product.

*Table I*

| Run No. | Starting Materials | | | | Product | | | | |
|---|---|---|---|---|---|---|---|---|---|
| | Butadiene, percent | Acrylonitrile, percent | Methyl Isopropenyl Ketone, percent | Conidendrol, percent | Conversion, percent | Tensile Strength, lbs./sq. in. | Elongation, percent | Shore Hardness | |
| | | | | | | | | A | C |
| 1 | 60 | 20 | 20 | a 0.3 | 100 | 930 | 300 | 67 | 27 |
| 2 | 60 | 20 | 20 | a 0.5 | 100 | 1,040 | 375 | 65 | 29 |
| 3 | 60 | 20 | 20 | a 1.0 | 100 | 1,660 | 500 | 65 | 28 |
| 4 | 60 | 20 | 20 | a 2.0 | 99 | 1,080 | 400 | 63 | 25 |
| 5 | 60 | 20 | 20 | b 0.3 | 100 | 865 | 400 | 64 | 26 |
| 6 | 60 | 20 | 20 | b 0.5 | 100 | 1,070 | 350 | 65 | 27 |
| 7 | 60 | 20 | 20 | b 1.0 | 100 | 1,150 | 350 | 66 | 29 |
| 8 | 60 | 20 | 20 | b 2.0 | 99 | 985 | 300 | 65 | 30 | a Alpha-conidendrol.
b Beta-conidendrol.

EXAMPLE 2

A charge of 60 parts by weight of butadiene, 20 parts of acrylonitrile and 20 parts of methyl isopropenyl ketone was polymerized for a period of 3 hours at a temperature of 5° C. in an aqueous emulsion recipe similar to that employed in Example 1, except using 150 parts of water and 0.05 part of alpha-conidendrol. The polymer was recovered by coagulating the latex without the addition of any stabilizing agent and was washed and dried. The conversion was 65.5 percent based on the monomers initially used. A portion of the copolymer was compounded with carbon black, zinc oxide, sulfur, stearic acid and benzothiazil disulfide in proportions as described in Example 1 to form a rubber composition which was cured as stated in said example. Test pieces were cut from the cured rubber sheet. The test pieces were used to determine the tensile strength and elongation for the composition employing procedures similar to those described in ASTM D412–47T. Hardness was determined by procedure similar to that described in ASTM D676–47T. The properties for the rubber composition were determined on test pieces as initially prepared and on test pieces that were aged at a temperature of 127° C. for 15 hours and 35 hours, respectively, employing ageing procedure similar to that described in ASTM D865–57. Table II identifies the rubber compositions and gives the properties determined for the product as initially prepared and after ageing of the product for 15 and 35 hours, respectively.

Table II

| Test No. | Ageing Time, Hours | Tensile Strength, lbs./sq. in. | Elongation, Percent | Shore Hardness | |
|---|---|---|---|---|---|
| | | | | A | C |
| 1 | None | 940 | 230 | 68 | 33 |
| 2 | 15 | 840 | 170 | 70 | 36 |
| 3 | 35 | 740 | 90 | 76 | 43 |

I claim:

1. In the process of polymerizing an aqueous emulsion of polymerizable synthetic rubber-forming monomers selected from the groups consisting of butadienes-1,3 and mixtures of butadienes-1,3 with compounds which contain a single $CH_2=C<$ group and are copolymerizable with butadiene-1,3, and containing an organic peroxide catalyst, an iron salt and an alkali salt of ethylene diamine tetraacetic acid, the step of carrying out the polymerization in the presence of from 0.01 to 5 percent by weight of conidendrol, based on the weight of the polymerizable monomers.

2. A process as claimed in claim 1, wherein the conidendrol is alpha-conidendrol.

3. A process as claimed in claim 1, wherein the conidendrol is beta-conidendrol.

4. A process which comprises polymerizing an aqueous emulsion of polymerizable synthetic rubber-forming monomers consisting of a mixture of at least 60 percent by weight of butadiene-1,3 with acrylonitrile and methyl isophenyl ketone in the presence of an organic peroxide catalyst, a water-soluble iron salt, an alkali salt of ethylenediamine tetraacetic acid and from 0.01 to 5 percent by weight of conidendrol, based on the weight of the polymerizable monomers.

5. A process which comprises polymerizing an aqueous emulsion of polymerizable synthetic rubber-forming monomers consisting of 60 percent by weight of butadiene-1,3, 20 percent of acrylonitrile and 20 percent of methyl isopropenyl ketone, at temperatures between 5° and 80° C. in the presence of from 0.02 to 2 percent of an organic peroxide catalyst, from 0.0002 to 0.02 part of iron in the form of a water-soluble iron salt, from 0.001 to 0.5 part of alkali salt of ethylenediamine tetraacetic acid and from 0.01 to 5 percent of conidendrol per 100 parts by weight of the polymerizable monomers initially used.

References Cited in the file of this patent

UNITED STATES PATENTS 2,560,741  Provost _____ July 17, 1951

OTHER REFERENCES

Mack et al.: Jour. of the American Oil Chemists' Society, vol. 29, #10, pp. 428–430 (October 1952).

UNITED STATES PATENT OFFICE
CERTIFICATE OF CORRECTION

Patent No. 2,968,645                                January 17, 1961

George B. Sterling

It is hereby certified that error appears in the above numbered patent requiring correction and that the said Letters Patent should read as corrected below.

Column 6, line 4, for "isophenyl" read -- isopropenyl --.

Signed and sealed this 12th day of September 1961.

(SEAL)
Attest:

ERNEST W. SWIDER                                DAVID L. LADD
Attesting Officer                                       Commissioner of Patents

USCOMM-DC